US008431217B2

(12) United States Patent
Gervasi et al.

(10) Patent No.: US 8,431,217 B2
(45) Date of Patent: Apr. 30, 2013

(54) CORE-SHELL PARTICLES AND FUSER MEMBER MADE THEREFROM

(75) Inventors: David J. Gervasi, Pittsford, NY (US); Matthew M. Kelly, West Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/230,345

(22) Filed: Sep. 12, 2011

(65) Prior Publication Data

US 2013/0065045 A1 Mar. 14, 2013

(51) Int. Cl.

| | |
|---|---|
| ***B32B 25/20*** | (2006.01) |
| ***B32B 27/08*** | (2006.01) |
| ***B32B 27/20*** | (2006.01) |
| ***G03G 15/20*** | (2006.01) |

(52) U.S. Cl.

USPC ........... 428/323; 399/333; 428/421; 428/422; 428/447; 428/448; 428/473.5; 523/205; 977/753

(58) Field of Classification Search ........................ None
See application file for complete search history.

(56) References Cited

U.S. PATENT DOCUMENTS

| | | | | |
|---|---|---|---|---|
| 2008/0099842 | A1* | 5/2008 | Gyoujin et al. | 257/347 |
| 2009/0123185 | A1* | 5/2009 | Lin et al. | 399/176 |
| 2010/0123746 | A1 | 5/2010 | Wu | |
| 2010/0124611 | A1 | 5/2010 | Mayo et al. | |
| 2010/0190100 | A1 | 7/2010 | Kelly et al. | |
| 2011/0300368 | A1* | 12/2011 | Qi et al. | 428/296.4 |

* cited by examiner

*Primary Examiner* — Ramsey Zacharia
(74) *Attorney, Agent, or Firm* — Hoffman Warnick LLC

(57) ABSTRACT

The present teachings describe a core-shell particle dispersed in a layer of a fuser member, thereby improving thermal conductivity of the fuser member. The core-shell particle includes a graphene core surrounded by a shell layer. The shell layer comprises a polymer selected from the group consisting of polypentafluorostyrene, polystyrene and poly-divinylbenzene. The core-shell particles can be dispersed in an intermediate layer or release layer of a fuser member.

20 Claims, 6 Drawing Sheets

CORE-SHELL PARTICLES AND FUSER MEMBER MADE THEREFROM

BACKGROUND

1. Field of Use

This disclosure is generally directed to thermally conductive particles and their use in fuser members useful in electrophotographic imaging apparatuses, including digital, image on image, and the like. In addition, the conductive particles and fuser members made therefrom can also be used in a transfix apparatus in a solid ink jet printing machine.

2. Background

In the electrophotographic printing process, a toner image can be fixed or fused upon a support (e.g., a paper sheet) using a fuser roller or belt. The surface of the fuser member requires that the thermal conductivity be within an acceptable range. Many polymers used as materials for fuser members are not inherently thermally conductive and require the addition of fillers into the polymer matrix to impart the proper thermal conductive properties.

There remains an interest in materials that can improve thermal conductivity in a polymer matrix.

SUMMARY

According to an embodiment, a fuser member is provided that comprises a substrate and a release layer. The release layer is disposed on the substrate. The release layer comprises a plurality of core-shell particles dispersed in a fluoropolymer wherein the core particles comprise graphene surrounded by a shell layer. The shell layer comprises a polymer formed from monomers of the formula:

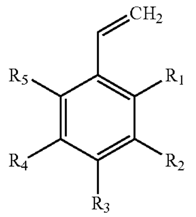

wherein $R_1$, $R_2$, $R_3$, $R_4$ and $R_5$ are a hydrogen, fluorine or $CH{=}CH_2$ group.

According to another embodiment, there is provided a core particle comprising a graphene core surrounded by shell layer. The shell layer comprises a polymer formed from monomers of the formula:

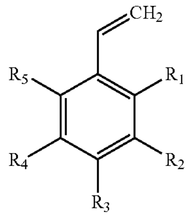

wherein $R_1$, $R_2$, $R_3$, $R_4$ and $R_5$ are a hydrogen, fluorine or $CH{=}CH_2$ group.

According to another embodiment there is provided a fuser member comprising a substrate and an intermediate layer. The intermediate layer comprises a plurality of core-shell particles dispersed in a material selected from the group consisting of silicone rubbers, siloxanes and fluoroelastomers. The core particles comprise graphene surrounded by a polymer shell layer the polymer selected from the group consisting of polypentafluorostyrene, polystyrene and polydivinylbenzene. The intermediate layer is disposed on the substrate. A release layer is disposed on the intermediate layer.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
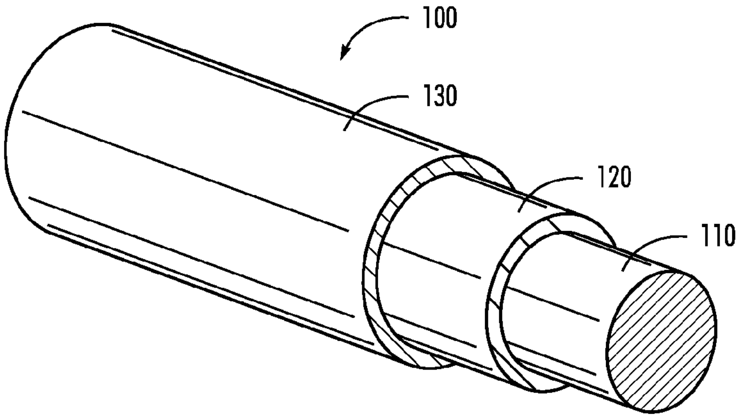
FIG. 1 depicts an exemplary fusing member having a cylindrical substrate in accordance with the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

The fixing member can include a substrate having one or more functional layers formed thereon. The substrate can include, e.g., a cylinder or a belt. Such fixing member can be used as an oil-less fusing member for high speed, high quality electrophotographic printing to ensure and maintain a good toner release from the fused toner image on an image supporting material (e.g., a paper sheet), and further assist paper stripping.

In various embodiments, the fixing member can include, for example, a substrate, with one or more functional layers formed thereon. The substrate can be formed in various shapes, e.g., a cylinder (e.g., a cylinder tube), a cylindrical drum, a belt, a drelt (a cross between a drum and a belt), or a film, using suitable materials that are non-conductive or conductive depending on a specific configuration, for example, as shown in FIGS. 1 and 2.

Figure 2:
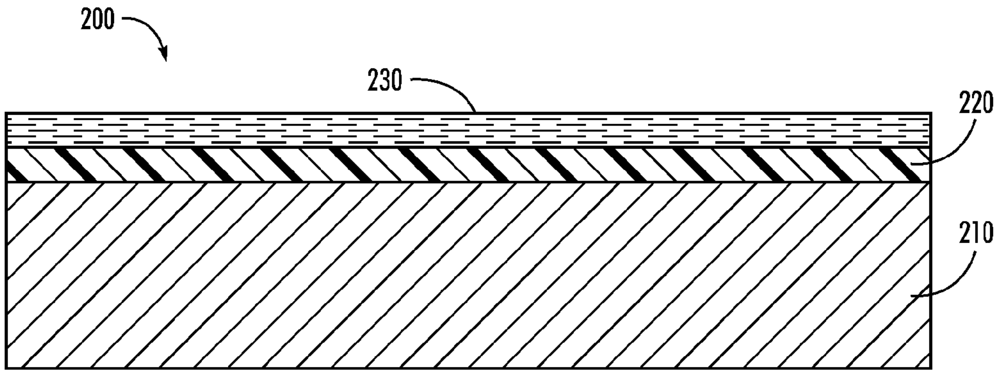
FIG. 2 depicts an exemplary fusing member having a belt substrate in accordance with the present teachings.

Specifically, FIG. 1 depicts an exemplary embodiment of a fixing or fusing member 100 having a cylindrical substrate 110 and FIG. 2 depicts another exemplary fixing or fusing member 200 having a belt substrate 210 in accordance with the present teachings. It should be readily apparent to one of ordinary skill in the art that the fixing or fusing member 100 depicted in FIG. 1 and the fixing or fusing member 200 depicted in FIG. 2 represent generalized schematic illustrations and that other layers/substrates can be added or existing layers/substrates can be removed or modified.

In FIG. 1 the exemplary fixing member 100 can be a fuser roller having a cylindrical substrate 110 with one or more functional layers 120 and an outer layer 130 (also referred to as a release layer) formed thereon. The outer layer 130 has a thickness of from about 5 microns to about 250 microns, or from about 10 microns to about 150 microns, or from about 15 microns to about 50 microns. In various embodiments, the cylindrical substrate 110 can take the form of a cylindrical tube, e.g., having a hollow structure including a heating lamp therein, or a solid cylindrical shaft. In FIG. 2, the exemplary fixing member 200 can include a belt substrate 210 with one or more functional layers, e.g., 220 and an outer surface 230 formed thereon. The outer layer 230 (also referred to as a release layer) has a thickness of from about 5 microns to about 250 microns, or from about 10 microns to about 150 microns, or from about 15 microns to about 50 microns.

Substrate Layer

The belt substrate 210 and the cylindrical substrate 110 can be formed from, for example, polymeric materials (e.g., polyimide, polyaramide, polyether ether ketone, polyetherimide, polyphthalamide, polyamide-imide, polyketone, polyphenylene sulfide, fluoropolyimides or fluoropolyurethanes) or metal materials (e.g., aluminum or stainless steel) to maintain rigidity and structural integrity as known to one of ordinary skill in the art.

Intermediate Layer

Examples of intermediate layers 120 and 220 (also referred to as functional layers) include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include the siloxanes (such as polydimethylsiloxanes); fluorosilicones (a fluoroelastomer) such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The intermediate layers provide elasticity and can be mixed with inorganic particles, for example SiC or $Al_2O_3$, as required.

Examples of intermediate layers 120 and 220 also include fluoroelastomers. Fluoroelastomers are from the class of 1) copolymers of two of vinylidenefluoride, hexafluoropropylene, and tetrafluoroethylene; 2) terpolymers of vinylidenefluoride, hexafluoropropylene, and tetrafluoroethylene; and 3) tetrapolymers of vinylidenefluoride, hexafluoropropylene, tetrafluoroethylene, and cure site monomer. These fluoroelastomers are known commercially under various designations such as VITON A®, VITON B®, VITON E®, VITON E 60C®, VITON E430®, VITON 910®, VITON GH®; VITON GF®; and VITON ETP®. The VITON designation is a Trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene) and FLUOREL II® (LII900) a poly(propylene-tetrafluoroethylenevinylidenefluoride) both also available from 3M Company, as well as the Tecnoflons identified as FOR-60KIR®, FOR-LHF® NM® FOR-THF®, FOR-TFS® TH® NH®, P757 TNS®, T439 PL958® BR9151® and TN505, available from Ausimont.

Examples of three known fluoroelastomers are (1) a class of copolymers of two of vinylidenefluoride, hexafluoropropylene, and tetrafluoroethylene, such as those known commercially as VITON A®; (2) a class of terpolymers of vinylidenefluoride, hexafluoropropylene, and tetrafluoroethylene known commercially as VITON B®; and (3) a class of tetrapolymers of vinylidenefluoride, hexafluoropropylene, tetrafluoroethylene, and cure site monomer known commercially as VITON GH® or VITON GF®.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

For a roller configuration, the thickness of the functional layer 120 can be from about 0.5 mm to about 10 mm, or from about 1 mm to about 8 mm, or from about 2 mm to about 7 mm. For a belt configuration, the functional layer 220 can be from about 25 microns up to about 2 mm, or from 40 microns to about 1.5 mm, or from 50 microns to about 1 mm. In embodiments the hardness of the functional layer 120 is from about 20 Shore A Durometer to about 80 Shore A Durometer, or from about 40 Shore A Durometer to about 60 Shore A Durometer or from about 50 Shore A Durometer to about 60 Shore A Durometer. In embodiments, the conductivity of the functional layer 120 is from about 0.1 W/mK to about 3.0 W/mK, or from about 1.0 W/mK to about 3.0 W/mK, or from about 2.5 W/mK to about 3.0 W/mK.

Release Layer

Fluoropolymers suitable for use in the as the surface layer 130 or 230 (also referred to as release layer) described herein include fluorine-containing polymers. These polymers include fluoropolymers comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymer include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof. The fluoropolymer particles provide chemical and thermal stability and have a low surface energy.

Adhesive Layer

Optionally, any known and available suitable adhesive layer may be positioned between the outer surface layer, the functional layer and the substrate. Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be wiped on the substrate. The adhesive layer can be coated on the substrate, or on the outer layer, to a thickness of from about 2 nanometers to about 2,000 nanometers, or from about 2 nanometers to about 500 nanometers. The adhesive can be coated by any suitable known technique, including spray coating or wiping.

Figure 3A:
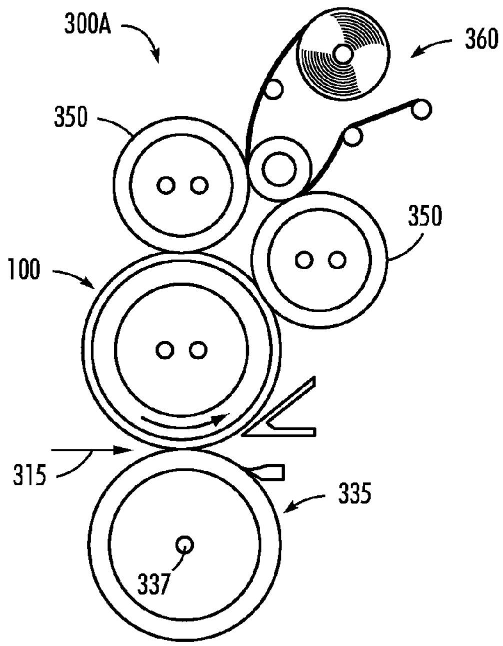
FIGS. 3A-3B depict exemplary fusing configurations using the fuser rollers shown in FIG. 1 in accordance with the present teachings.
Figure 3B:
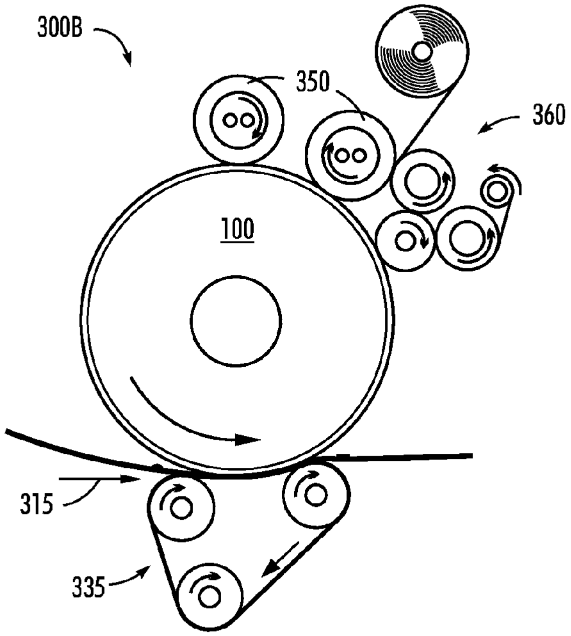
Figure 4A:
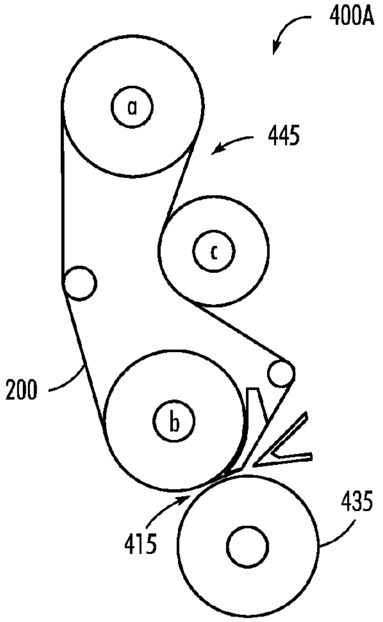
FIGS. 4A-4B depict other exemplary fusing configurations using the fuser belt shown in FIG. 2 in accordance with the present teachings.
Figure 4B:
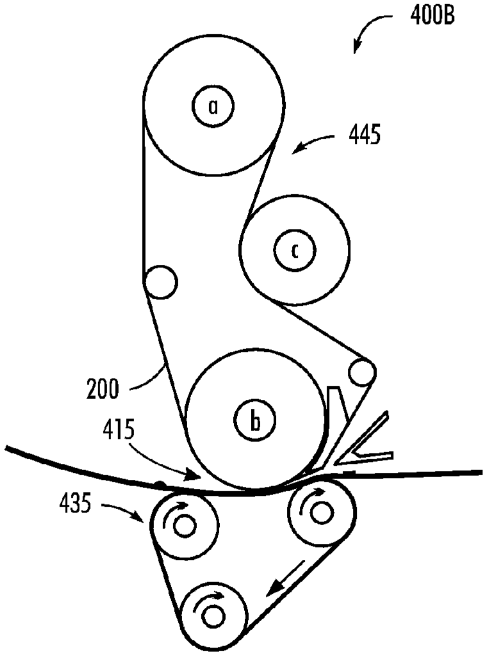

FIGS. 3A-4B and FIGS. 4A-4B depict exemplary fusing configurations for the fusing process in accordance with the present teachings. It should be readily apparent to one of ordinary skill in the art that the fusing configurations 300A-B depicted in FIGS. 3A-3B and the fusing configurations 400A-B depicted in FIGS. 4A-4B represent generalized schematic illustrations and that other members/layers/substrates/configurations can be added or existing members/layers/substrates/configurations can be removed or modified. Although an electrophotographic printer is described herein, the disclosed apparatus and method can be applied to other printing technologies. Examples include offset printing and inkjet and solid transfix machines.

FIGS. 3A-3B depict the fusing configurations 300A-B using a fuser roller shown in FIG. 1 in accordance with the present teachings. The configurations 300A-B can include a fuser roller 100 (i.e., 100 of FIG. 1) that forms a fuser nip with a pressure applying mechanism 335, such as a pressure roller in FIG. 3A or a pressure belt in FIG. 3B, for an image supporting material 315. In various embodiments, the pressure applying mechanism 335 can be used in combination with a heat lamp 337 to provide both the pressure and heat for the fusing process of the toner particles on the image supporting material 315. In addition, the configurations 300A-B can include one or more external heat roller 350 along with, e.g., a cleaning web 360, as shown in FIG. 3A and FIG. 3B.

FIGS. 4A-4B depict fusing configurations 400A-B using a fuser belt shown in FIG. 2 in accordance with the present teachings. The configurations 400A-B can include a fuser belt 200 (i.e., 200 of FIG. 2) that forms a fuser nip with a pressure applying mechanism 435, such as a pressure roller in FIG. 4A or a pressure belt in FIG. 4B, for a media substrate 415. In various embodiments, the pressure applying mechanism 435 can be used in a combination with a heat lamp to provide both the pressure and heat for the fusing process of the toner particles on the media substrate 415. In addition, the configurations 400A-B can include a mechanical system 445 to move the fuser belt 200 and thus fuse the toner particles and forming images on the media substrate 415. The mechanical system 445 can include one or more rollers 445*a-c*, which can also be used as heat rollers when needed.

Figure 5:
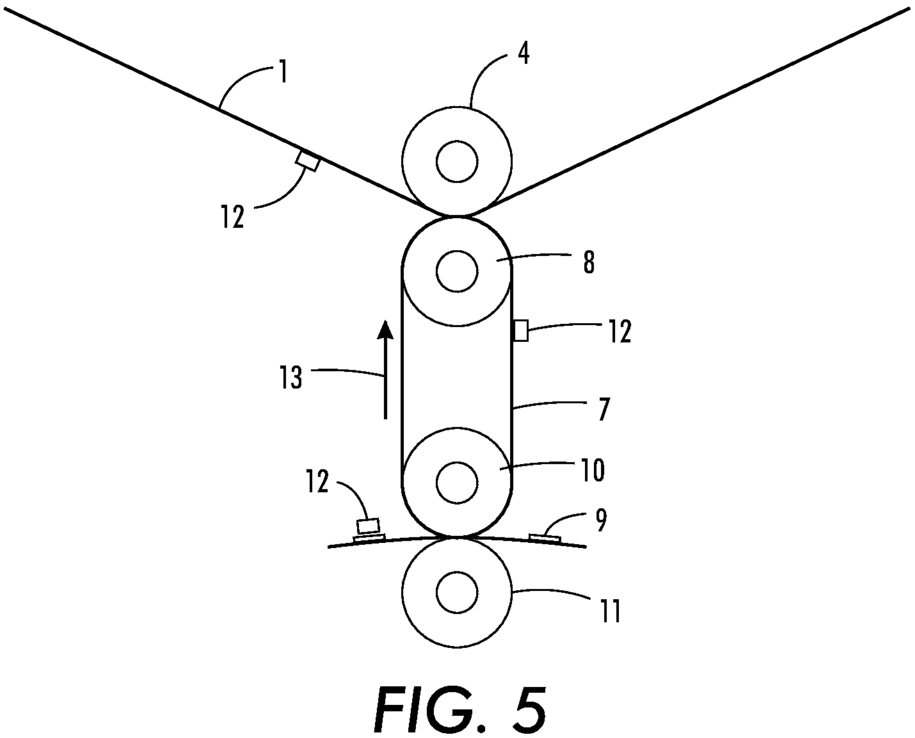
FIG. 5 depicts an exemplary fuser configuration using a transfix apparatus.

FIG. 5 demonstrates a view of an embodiment of a transfix member 7 which may be in the form of a belt, sheet, film, or like form. The transfix member 7 is constructed similarly to the fuser belt 200 described above. The developed image 12 positioned on intermediate transfer member 1 is brought into contact with and transferred to transfix member 7 via rollers 4 and 8. Roller 4 and/or roller 8 may or may not have heat associated therewith. Transfix member 7 proceeds in the direction of arrow 13. The developed image is transferred and fused to a copy substrate 9 as copy substrate 9 is advanced between rollers 10 and 11. Rollers 10 and/or 11 may or may not have heat associated therewith.

Disclosed herein is an encapsulated or core-shell particle based on commercially available graphene particles. The core-shell particle is used to form a release layer on a fuser member. The release layer is formed by dispersing the core-shell particles in a fluoropolymer. The release layer provides superior thermal conductivity in a fuser member when compared to unencapsulated graphene particles. The graphene particles are coated with a layer of a fluorinated monomer and by way of surface initiated polymerization producing a coating or shell layer on the surface of the graphene particles. This improves the dispersibility of the core-shell particles in a fluoropolymer and the eventual composite thermal conductivity of the resulting layer. This improved core shell particles can be used as a fuser material in a variety of fusing subsystems and layers.

In embodiments the core-shell particles can be used in the intermediate layer. As described previously, the intermediate layer is a material such as silicone rubber, low temperature vulcanization (LTV) silicone rubbers, siloxanes (such as polydimethylsiloxanes); fluorosilicones; liquid silicone rubbers such as vinyl crosslinked heat curable rubbers or silanol room temperature crosslinked materials; and the like. The intermediate layer can be a fluoroelastomer. The intermediate layers can be mixed with the core-shell particles described herein.

The encapsulation to create core shell particles described herein is more effective than conventional silane treatment or other treatments of nanoparticulates. Particles of graphene are encapsulated with from about 1 weight percent to about 20 weight percent polymer based on the total weight of the core-shell particles, or from about 1 weight percent to about 10 weight percent polymer based on the total weight of the core-shell particles, or from about 1 weight percent to about 5 weight percent polymer based on the total weight of the core-shell particles. The graphene particles range from about 1 nm to about 20 nm in thickness, or in embodiments from about 1 nm to about 10, or from about 3 nm to about 10 nm. The particles face dimensions range from about 2 microns to about 20 microns, or from about 1 micron to about 10 microns, or from about 1 micron to about 5 microns. The core-shell graphene particles provide improved dispersibility in fluoropolymer or silicones during formulation and preparation of the functional or release layers. The encapsulation is achieved through the use of a fluorinated vinyl monomer, polystyrene and/or polydivinylbenzene. The coating on the graphene chemically resembles the fluoropolymer. It is also possible that other encapsulating coatings can be substituted with monofluoro- and pentafluoro-styrene and other commercially available monomers for more thermally stable and polymer-compatible organic coatings.

In embodiments, free radical polymerization of several styrene analogs can be conducted on the surface of the graphene particles. The graphene particles being encapsulated are added to a reaction vessel with a coupler such as 4-vinylpyridene or a functional silane dissolved in an organic solvent as shown schematically in FIG. 6. The coupler is optional. Acceptable organic solvents include hexane, cyclohexane mineral spirits, toluene, isopropyl alcohol. Monomers are added and the vessel is maintained at about 70° C. to about 80° C., followed by the addition of initiator, such as benzoyl peroxide or aluminum chloride. The reactants are stirred overnight for 16-20 hours, centrifuged, washed in an acceptable organic solvent, and dried for about 24 hours at about 80° C. in a vacuum oven. The monomers used are represented by the generic formula:

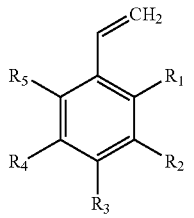

wherein $R_1$, $R_2$, $R_3$, $R_4$ and $R_5$ are a hydrogen, fluorine or $CH{=}CH_2$ group. The monomers used in the examples are divinylbenzene, styrene, and pentafluorostyrene.

Figure 6:
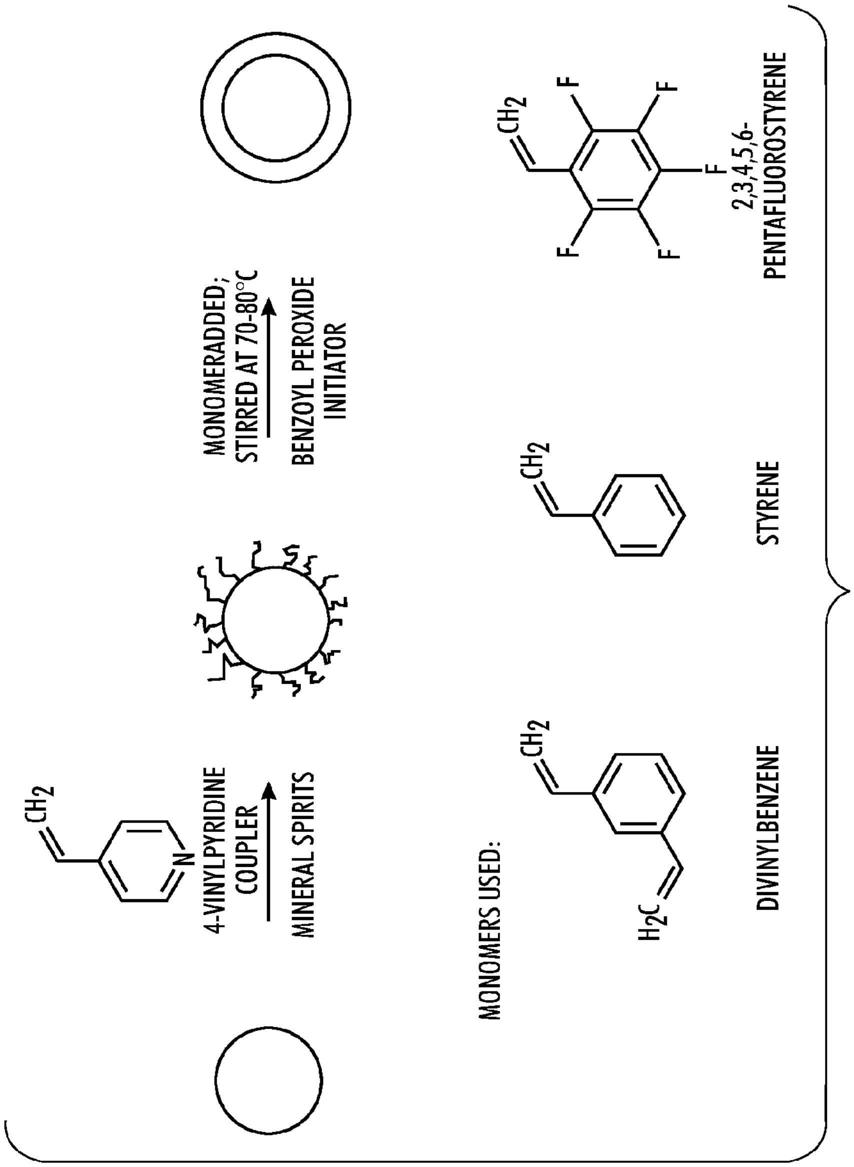
FIG. 6 depicts a schematic of the encapsulation process.

The reaction is depicted in FIG. 6. The shell of the particle can be a homopolymer or a copolymer. In the copolymer embodiments the weight ratios of divinylbenzene:styrene:pentafluorostyrene can vary from about 100:0:0 to about 50:0:50 to about 50:25:25 and all ratios in between. The thickness of the shell layer is from about 1 nanometer to about 100 nanometers, or from about 5 nanometers to about 50 nanometers, or from about from about 10 nanometers to about 250 nanometers.

To make a release layer or intermediate layer using the core-shell graphene particles described above, a polymer of choice is dissolved thoroughly in an appropriate solvent, Suitable solvents for dissolving the polymer include methyl ethyl ketone (MEK), methyl isobutyl ketone (MIBK), methyl-tertbutyl ether (MTBB), methyl n-amyl ketone (MAK), tetrahydrofuran (THF), Alkalis, methyl alcohol, ethyl alcohol, acetone, ethyl acetate, butyl acetate, or any other low molecular weight carbonyls, polar solvents, fireproof hydraulic fluids, along with the Wittig reaction solvents such as dimethyl formamide (DMF), dimethyl sulfoxide (DMSO) and N-methyl 2 pyrrolidone (NMP) Then the encapsulated graphene particles are added in a sufficient amount to achieve the desired properties. Suitable polymers for fusing applications include silicones, siloxanes, fluorosilicones, fluoroelastomers and fluoroplastics as described previously. The mixture is thoroughly mixed by the use of a stir rod or blade or a sonication device after which additional chemical curatives are added. The weight ratio of the core-shell or encapsulated particles is from about 80:20 to about 95:5 (core:shell).

In embodiments, about 0.5 weight percent to about 40 weight percent of encapsulated graphene particles can be provided in a release layer for enhanced thermal conductivity. In embodiments, about 1 weight percent to about 20 weight percent of encapsulated graphene particles, or from about 2 weight percent to about 10 weight percent of encapsulated graphene particles can be provided in a release layer or functional layer for enhanced thermal conductivity. A release layer or intermediate can be formed through spray coating, flow coating injection molding or another suitable method.

Fluoropolymers suitable for use in the release layer described herein include fluorine-containing polymers. These polymers include fluoropolymers comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymer include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof. The fluoropolymer particles provide chemical and thermal stability and have a low surface energy. The fluoropolymer particles have a melting temperature of from about 200° C. to about 400° C., or from about 255° C. to about 360° C. or from about 280° C. to about 330° C.

Additives and additional conductive or non-conductive fillers may be present in the above-described release layer. In various embodiments, other filler materials or additives including, for example, inorganic particles, can be used for the coating composition and the subsequently formed surface layer. Conductive fillers used herein include carbon blacks such as carbon black, graphite, fullerene, acetylene black, fluorinated carbon black, and the like; carbon nanotubes; metal oxides and doped metal oxides, such as tin oxide, antimony dioxide, antimony-doped tin oxide, titanium dioxide, indium oxide, zinc oxide, indium oxide, indium-doped tin trioxide, and the like; and mixtures thereof. Certain polymers such as polyanilines, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts and mixtures thereof can be used as conductive fillers. In various embodiments, other additives known to one of ordinary skill in the art can also be included to form the disclosed composite materials.

Fillers may be added from about 0 weight percent to about 30 weight percent, or from about 0 weight percent to about 5 weight percent, or from about 1 weight percent to about 3 weight percent. The thermal conductivity range of the layer ranged from about 0.1 W/mK to about 3.0 W/mK, or from about 1.0 W/mK to about 3.0 W/mK, or from about 2.5 W/mK to about 3.0 W/mK.

Specific embodiments will now be described in detail. These examples are intended to be illustrative, and not limited to the materials, conditions, or process parameters set forth in these embodiments. All parts are percentages by solid weight unless otherwise indicated.

EXAMPLES

A series of core shell graphene particles were manufactured as described above. The graphene particles had a shell layer of either polydivinaylbenzene (PDVB), polystyrene (PS) or polypentafluorostyrene (PPFS). There was also a control using graphene particles with no shell layer.

Figure 7:
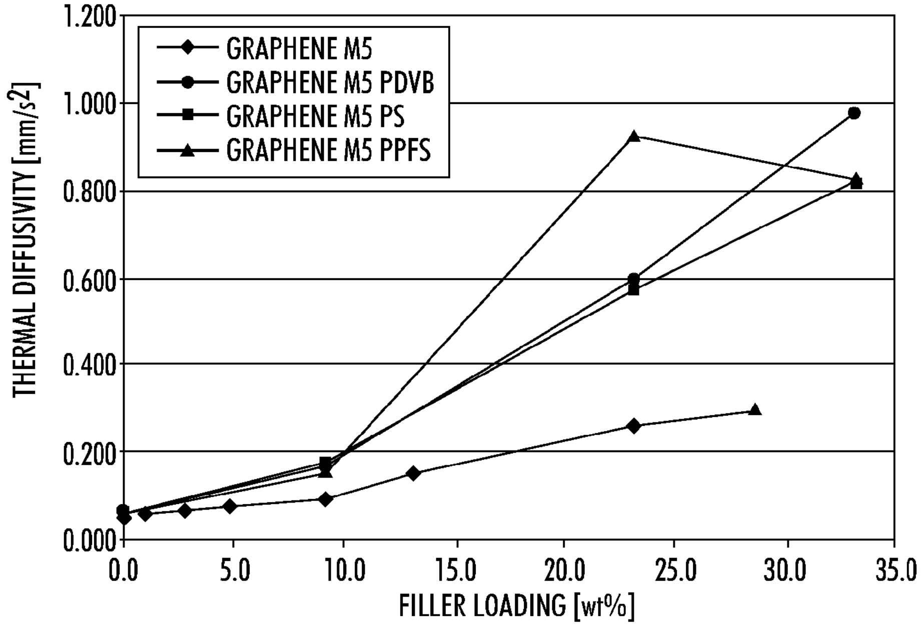
FIG. 7 is a comparison of thermal diffusivity versus filler loading of encapsulated and unencapsulated graphene particles.
Figure 8:
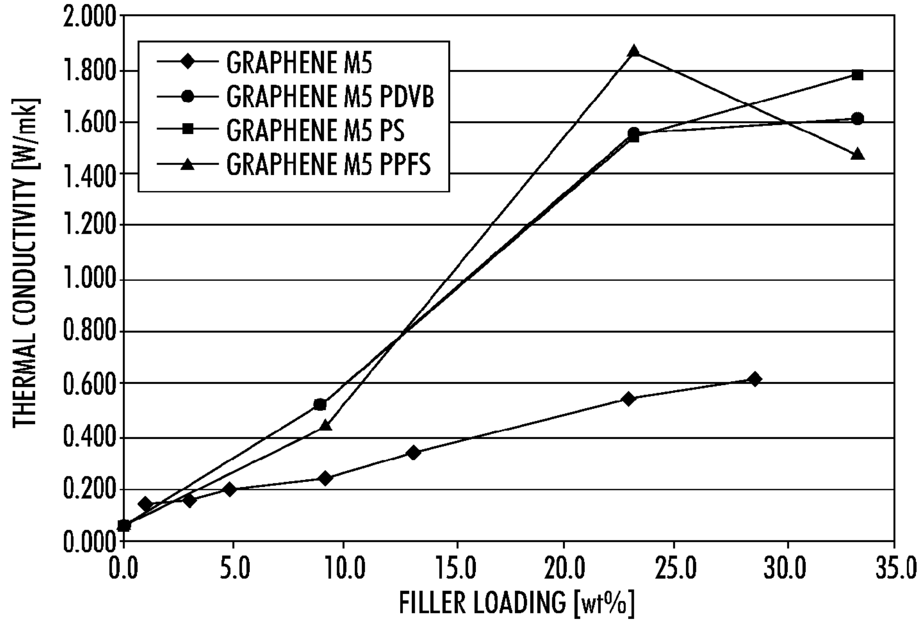
FIG. 8 is a comparison of thermal conductivity versus filler loading of encapsulated and unencapsulated graphene particles.

Nanocomposite films composed of a series of loadings of unencapsulated and encapsulated graphene particles in a fluoroelastomer (Viton GF from Dupont) were prepared. The films were evaluated at 25° C. for thermal diffusivity and thermal conductivity. The results are plotted in FIG. 7 and FIG. 8. All of the core-shell graphene films have much higher thermal diffusivity and conductivity increase than unecapsulated graphene particles in a fluoropolymer. In addition, encapsulated graphene particle nanocomposites have over two times the diffusivity and four times the conductivity when compared to the uncoated graphene nanocomposites series. Through-plane thermal diffusivity and conductivity were measured with the Netzsch Nanoflash LFA-447. FIGS. 7 and 8 depict the thermal diffusivity and thermal conductivity, respectively, as a function of particle loading by weight percent.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A fuser member, comprising a substrate, an optional intermediate layer; and a release layer disposed on the substrate or optional intermediate layer, wherein said release layer comprises a plurality of core-shell particles dispersed in a fluoropolymer wherein the core shell particles comprise graphene particles surrounded by a polymer shell layer, the polymer formed from monomers of the formula:

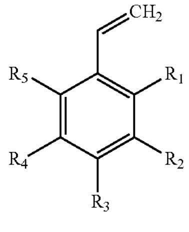

wherein $R_1$, $R_2$, $R_3$, $R_4$ and $R_5$ are a hydrogen, fluorine or $CH{=}CH_2$ group.

2. The fuser member of claim 1, wherein the polymer shell layer comprises a polymer selected from the group consisting of polypentafluorostyrene, polystyrene and polydivinylbenzene and mixtures thereof.

3. The fuser member of claim 1, wherein the fluoropolymer comprises a fluoroplastic is selected from the group consisting of polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP).

4. The fuser member of claim 1, wherein the graphene particles comprise a size of from about 1 nm to about 20 nm.

5. The fuser member of claim 1, wherein the shell layer has a thickness of from about 1 nanometer to about 100 nanometers.

6. The fuser member of claim 1, wherein a weight ratio of the core to shell in the core shell particles comprises from about 80:20 to about 95:5.

7. The fuser member of claim 1, wherein the plurality of core-shell particles are present in the release layer an amount of from about 0.5 weight percent to about 40 weight percent based on a weight of the release layer.

8. The fuser member of claim 1, further comprising an intermediate layer disposed between the substrate and the release layer.

9. The fuser member of claim 7, wherein the intermediate layer comprises a material selected from the group consisting of silicone rubbers, siloxanes, fluorosilicones and fluoroelastomers.

10. The fuser member of claim 1, wherein the substrate comprises a material selected from the group consisting of polyimide, polyaramide, polyether ether ketone, polyetherimide, polyphthalamide, polyamide-imide, polyketone, polyphenylene sulfide, fluoropolyimide, fluoropolyurethanes, and metals.

11. The fuser member of claim 1, wherein the release layer comprises a thermal conductivity of from about 0.1 W/mK to about 3.0 W/mK.

12. A release layer comprising a plurality of core-shell particles comprising a graphene core surrounded by shell layer, wherein the shell layer comprises a polymer formed from monomers of the formula:

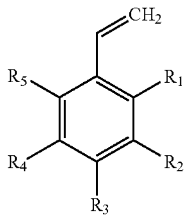

wherein $R_1$, $R_2$, $R_3$, $R_4$ and $R_5$ are a hydrogen, fluorine or $CH{=}CH_2$ group, wherein the plurality of core-shell particles are dispersed in a fluoropolymer.

13. The release layer of claim 12, wherein the polymer shell layer comprises a polymer selected from the group consisting of polypentafluorostyrene, polystyrene and polydivinylbenzene and mixtures thereof.

14. The release layer of claim 12, wherein the shell layer comprises a thickness of from about 1 nanometer to about 100 nanometers.

15. A fuser member, comprising a substrate, an intermediate layer disposed on the substrate, wherein said intermediate layer comprises a plurality of core-shell particles dispersed in a material selected from the group consisting of silicone rubbers, siloxanes and fluoroelastomers wherein the core-shell particles comprise graphene encapsulated by a polymer shell layer, said polymer selected from the group consisting of polypentafluorostyrene, polystyrene, polydivinylbenzene and mixtures thereof disposed on the substrate; and a release layer disposed on the intermediate layer.

16. The fuser member of claim 15, wherein the shell layer has a thickness of from about 1 nanometer to about 100 nanometers.

17. The fuser member of claim 15, wherein the shell layer comprises from about 1 weight percent to about 20 weight percent of the core-shell particles.

18. The fuser member of claim 15, wherein the intermediate layer comprises a thermal conductivity of from about 0.1 W/mK to about 3.0 W/mK.

19. The fuser member of claim 15, wherein the release layer comprising a plurality of core-shell particles dispersed in a fluoropolymer wherein the core shell particles comprise graphene surrounded by a polymer shell layer, the polymer of the shell layer selected from the group consisting of polypentafluorostyrene, polystyrene, polydivinylbenzene and mixtures thereof.

20. The fuser member of claim 15, wherein the release layer comprises a thermal conductivity of from about 0.1 W/mK to about 3.0 W/mK.

* * * * *